United States Patent
Franz et al.

(10) Patent No.: US 10,775,355 B2
(45) Date of Patent: Sep. 15, 2020

(54) AUTOMATED CLINICAL DIAGNOSTIC SYSTEM AND METHOD USING PARALLEL LIQUID CHROMATOGRAPHY CHANNELS AND SAMPLE PREPARATION WORKFLOWS

(71) Applicant: Roche Diagnostics Operations, Inc., Indianapolis, IN (US)

(72) Inventors: Tobias Franz, Munich (DE); Uwe Kobold, Weilheim (DE); Peter Kupser, Munich (DE); Roland Thiele, Sindelsdorf (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 272 days.

(21) Appl. No.: 16/009,434

(22) Filed: Jun. 15, 2018

(65) Prior Publication Data

US 2018/0292368 A1   Oct. 11, 2018

Related U.S. Application Data

(63) Continuation of application No. PCT/EP2016/081538, filed on Dec. 16, 2016.

(30) Foreign Application Priority Data

Dec. 18, 2015   (EP) .................................... 15201395

(51) Int. Cl.
*G01N 30/88*   (2006.01)
*G01N 30/06*   (2006.01)
(Continued)

(52) U.S. Cl.
CPC ......... *G01N 30/88* (2013.01); *B01D 15/1885* (2013.01); *G01N 30/06* (2013.01);
(Continued)

(58) Field of Classification Search
CPC ......... G01N 30/88; G01N 30/06; G01N 30/08
(Continued)

(56) References Cited

U.S. PATENT DOCUMENTS 4,364,263 A * 12/1982 Sankoorikal ........... G01N 30/22
                                                        210/198.2
4,835,707 A *  5/1989 Amano .................... C12Q 1/00
                                                        422/62
(Continued)

FOREIGN PATENT DOCUMENTS

EP      1089074 A1    4/2001
EP      1881329 A2    1/2008
(Continued)

OTHER PUBLICATIONS de Kanel, J. et al, Jornal of Forensic Science 1998, 43, 622-625.*
(Continued)

*Primary Examiner* — Arlen Soderquist
(74) *Attorney, Agent, or Firm* — Roche Diagnostics Operations, Inc.

(57) ABSTRACT

A clinical diagnostic system is presented and comprises a sample preparation station for automatically preparing samples comprising analytes of interest, a liquid chromatography (LC) separation station comprising a plurality of LC channels and a sample preparation/LC interface for inputting prepared samples into the LC channels. The system further comprises a controller to assign samples to pre-defined sample preparation workflows each comprising a pre-defined sequence of sample preparation steps and requiring a pre-defined time for completion depending on the analytes. The controller further assigns an LC channel for each prepared sample depending on the analytes and plans an LC channel input sequence for inputting the prepared samples that allows analytes from different LC channels to elute in a non-overlapping LC eluate output sequence
(Continued)

US 10,775,355 B2

Page 2 based on expected elution times. The controller further sets and initiates a start sequence that generates a prepared sample output sequence that matches the LC channel input sequence.

14 Claims, 7 Drawing Sheets

(51) Int. Cl.
G01N 30/08 (2006.01)
G01N 30/24 (2006.01)
G01N 30/46 (2006.01)
G01N 30/72 (2006.01)
G01N 35/00 (2006.01)
B01D 15/18 (2006.01)
G01N 30/60 (2006.01)
G01N 1/40 (2006.01)
G01N 30/02 (2006.01)

(52) U.S. Cl.
CPC .......... G01N 30/08 (2013.01); G01N 30/24 (2013.01); G01N 30/466 (2013.01); G01N 30/724 (2013.01); G01N 35/0092 (2013.01); G01N 35/0098 (2013.01); G01N 1/405 (2013.01); G01N 30/6039 (2013.01); G01N 2030/027 (2013.01); G01N 2030/8804 (2013.01)

(58) Field of Classification Search
USPC .................................. 422/70; 436/161, 178
See application file for complete search history.

(56) References Cited

U.S. PATENT DOCUMENTS

| 5,800,784 | A * | 9/1998 | Horn | B01L 3/5025 |
| | | | | 422/535 |
| 6,296,771 | B1 * | 10/2001 | Miroslav | G01N 30/466 |
| | | | | 210/143 |
| 6,318,157 | B1 * | 11/2001 | Corso | G01N 30/466 |
| | | | | 210/198.2 |
| 6,436,292 | B1 * | 8/2002 | Petro | G01N 35/085 |
| | | | | 210/143 |
| 7,132,650 | B1 * | 11/2006 | Gamble | G01N 30/7233 |
| | | | | 250/288 |
| 2001/0047086 | A1 * | 11/2001 | Cramer | C07K 1/22 |
| | | | | 530/417 |
| 2002/0084222 | A1 | 7/2002 | Brann | |
| 2002/0127739 | A1 * | 9/2002 | Pieper | G01N 30/461 |
| | | | | 436/515 |
| 2004/0026617 | A1 * | 2/2004 | Gregori | G01N 30/84 |
| | | | | 250/288 |
| 2004/0089057 | A1 * | 5/2004 | Hobbs | G01N 30/6095 |
| | | | | 73/61.58 |
| 2004/0089607 | A1 * | 5/2004 | Hobbs | G01N 30/466 |
| | | | | 210/656 |
| 2004/0217279 | A1 * | 11/2004 | Hobbs | H01J 49/009 |
| | | | | 250/288 |
| 2004/0226884 | A1 * | 11/2004 | O'Connor | B01L 3/565 |
| | | | | 210/634 |
| 2005/0161669 | A1 * | 7/2005 | Jovanovich | B01L 3/502738 |
| | | | | 257/48 |
| 2006/0127284 | A1 | 6/2006 | Mallet | |
| 2006/0223118 | A1 * | 10/2006 | Eldridge | C40B 40/04 |
| | | | | 435/7.1 |
| 2007/0000838 | A1 * | 1/2007 | Shih | G01N 30/466 |
| | | | | 210/656 |
| 2008/0028930 | A1 * | 2/2008 | Danilchik | G01N 30/14 |
| | | | | 95/87 |
| 2009/0090855 | A1 * | 4/2009 | Kobold | B01D 15/325 |
| | | | | 250/282 |
| 2009/0253210 | A1 * | 10/2009 | Kobold | G01N 33/5002 |
| | | | | 436/63 |
| 2010/0050749 | A1 * | 3/2010 | Yuan | B01L 3/502715 |
| | | | | 73/61.55 |
| 2010/0086443 | A1 * | 4/2010 | Neyer | G01N 30/16 |
| | | | | 422/70 |
| 2013/0206653 | A1 * | 8/2013 | Brann | B01D 15/22 |
| | | | | 210/85 |
| 2013/0295597 | A1 | 11/2013 | Dewitte et al. | |
| 2013/0303409 | A1 | 11/2013 | Kapps | |
| 2014/0047906 | A1 * | 2/2014 | Herman | G01N 33/9493 |
| | | | | 73/61.55 |
| 2014/0178979 | A1 * | 6/2014 | Herman | G01N 30/08 |
| | | | | 435/288.6 |
| 2014/0299542 | A1 * | 10/2014 | Song | G01N 30/88 |
| | | | | 210/635 |
| 2016/0195564 | A1 * | 7/2016 | Hewitson | G01N 30/06 |
| | | | | 436/54 |

FOREIGN PATENT DOCUMENTS

| EP | 2402766 A1 | 1/2012 |
| EP | 2955527 A1 | 12/2015 |
| WO | 2012/058619 A1 | 5/2012 |
| WO | 2012/058632 A1 | 5/2012 |
| WO | 2013/151920 A1 | 10/2013 |

OTHER PUBLICATIONS

Bayliss, M. K. et al, Rapid Communications in Mass Spectrometry 2000, 14, 2039-2045.*
Wu, J.-T., Rapid Communications in Mass Spectrometry 2001, 15, 73-81.*
Van Pelt, C. K. et al, Analytical Chemistry 2001, 73, 582-588.*
Jemal, M. et al, Rapid Communications in Mass Spectrometry 2001, 15, 994-999.*
Gross, G. M. et al, Analytica Chimica Acta 2003, 490, 197-210.*
Edwards, C. et al, Rapid Communications in Mass Spectrometry 2003, 17, 2027-2033.*
Martens-Lobenhoffer, J. et al, Journal of Chromatography B 2003, 798, 231-239.*
Patel, P. et al, Journal of the Association for Laboratory Automation 2004, 9, 185-191.*
Pedersen-Bjergaard, S. et al, Journal of Chromatography B 2005, 817, 3-12.*
Favretto, D. et al, International Journal of Legal Medicine 2007, 121, 259-265.*
Zorza, G. et al, Journal of Chromatography B 2007, 853, 294-302.*
Teixeira, H. et al, Forensic Science International 2007, 170, 148-155.*
Chiu, M. L. et al, Journal of the Association for Laboratory Automation 2010, 15, 233-242.*
Dahn, T. et al, in "Clinical Applications of Mass Spectrometry, Methods in Molecular Biology" Garg, U. et al, (eds) , 2010, 422. 603, 411-.*
Johansen, S. S. et al, Journal of Analytical Toxicology 2011, 35, 8-14.*
Kortz, L. et al, Analytical and Bioanalytical Chemistry 2011, 399, 2635-2644.*
Dahl, S. R. et al, Journal of Chromatography B 2012, 885-886, 37-42.*
Andersen, D. et al, Journal of Analytical Toxicology 2012, 36, 280-287.*
Eichhorst, J. C. et al, in "LC-MS in Drug Analysis: Methods and Protocols, Methods in Molecular Biology" Langnnan, L. J. et al.(eds), 2012, 902, 29-41.*
Klavins, K. et al, Analytical Chemistry 2014, 86, 4145-4150.*
Wei, B. et al, Clinica Chinnica Acta 2014, 436, 290-297.*
International Search Report dated Apr. 3, 2017, in Application No. PCT/EP2016/081538, 3 pp.

* cited by examiner

Testosterone

| | | | Sample Aliquot | | | |
|---|---|---|---|---|---|---|
| | | | IS | no IS | | |
| | | E | LR #1 | LR #2 | | |
| | | | enrichment | depletion | | |
| | MB A | MB B | MB C | MB D | | |
| | | W #1 | W #2 | W #3 | W #4 | |
| | | | elution #1 | elution #2 | elution #3 | elution #4 |
| | | FIA | faster LC | slower LC | | |
| | | | ESI | APCI | | |
| | | | FAIMS | No FAIMS | | |
| MS MRM #1 | MS MRM #2 | MS MRM #3 | MS MRM #4 | MS MRM #5 | MS MRM #6 | |

Benzodiazepines

| | | | Sample Aliquot | | | |
|---|---|---|---|---|---|---|
| | | | IS | no IS | | |
| | | E | LR #1 | LR #2 | | |
| | | | enrichment | depletion | | |
| | MB A | MB B | MB C | MB D | | |
| | | W #1 | W #2 | W #3 | W #4 | |
| | elution #1 | elution #2 | elution #3 | elution #4 | | |
| | FIA | faster LC | slower LC | | | |
| | | | ESI | APCI | | |
| | | | FAIMS | No FAIMS | | |
| | | | MS MRM #1 | MS MRM #2 | MS MRM #3 | MS MRM #4 | MS MRM #5 | MS MRM #6 |

Rapamycin

| | | | Sample Aliquot | | | |
|---|---|---|---|---|---|---|
| | | | IS | no IS | | |
| | E | LR #1 | LR #2 | | | |
| | | enrichment | depletion | | | |
| | | | MB A | MB B | MB C | MB D |
| W #1 | W #2 | W #3 | W #4 | | | |
| elution #1 | elution #2 | elution #3 | elution #4 | | | |
| | | FIA | faster LC | slower LC | | |
| | | | ESI | APCI | | |
| | | | FAIMS | No FAIMS | | |
| | | | MS MRM #1 | MS MRM #2 | MS MRM #3 | MS MRM #4 | MS MRM #5 | MS MRM #6 |

AUTOMATED CLINICAL DIAGNOSTIC SYSTEM AND METHOD USING PARALLEL LIQUID CHROMATOGRAPHY CHANNELS AND SAMPLE PREPARATION WORKFLOWS

CROSS-REFERENCE TO RELATED APPLICATIONS

This application is a continuation of PCT/EP2016/081538, filed Dec. 16, 2016, which is based on and claims priority to EP 15201395.9, filed Dec. 18, 2015, which is hereby incorporated by reference.

BACKGROUND

The present disclosure generally relates to a clinical diagnostic system and method that includes automated sample preparation before multiplexed liquid chromatography and that is optionally coupled to mass spectrometry.

There is growing interest for the implementation of mass spectrometry and more specifically of liquid chromatography coupled to tandem mass spectrometry (LC-MS/MS) in the clinical laboratory. The number of published methods especially for small molecules in therapeutic drug monitoring or drug of abuse testing is increasing.

Some ready to use kits for pre-validated clinical MS applications are becoming commercially available.

The use of mass spectrometry, however, even in connection with such kits, may not be regulatory approved for clinical diagnostics. This is mostly because of lack of standardized procedures, except for a very few analytes, and because of the still large number of user dependent factors, e.g. due to a number of manual steps that are still conducted and the diversity of hardware components that may be used and combined, and that play a role in delivering reliable and reproducible results of clinical relevance. In particular, sample preparation is typically a manual and tedious procedure. Protein precipitation with subsequent centrifugation is the most popular method to remove unwanted and potentially disturbing sample matrix. The use of kits may in part facilitate sample preparation that can be at least in part automated. Kits are however available only for a limited number of analytes of interest and the entire process from sample preparation, to separation and detection remains complex, requiring the attendance of highly trained laboratory personnel to run highly sophisticated instruments.

Also, typically, a batch approach is followed, where a batch of samples prepared in advance under the same preparation conditions undergo consecutive separation runs under the same separation conditions. This approach however does not enable high throughput and is not flexible, e.g., does not allow re-scheduling (changing a pre-defined processing sequence) in view for example of incoming emergency samples that have higher priority and have to be processed first.

Therefore, there is a need for a system and a method, that makes use of a LC coupled to mass spectrometry, that is more convenient and more reliable and therefore suitable for clinical diagnostics such that high-throughput, e.g. up to 100 samples/hour or more with random access sample preparation and LC separation can be obtained while enabling online coupling to mass spectrometry as well as being fully automated to increase the walk-away time and decrease the level of skills required.

SUMMARY

According to the present disclosure, a clinical diagnostic system is presented. The clinical diagnostic system can comprise a sample preparation station for the automated preparation of samples comprising analytes of interest, a liquid chromatography (LC) separation station comprising a plurality of LC channels (C1-$n$, C'1-$n$) arranged in parallel, a sample preparation/LC interface for inputting prepared samples into any one of the LC channels (C1-$n$, C'1-$n$), and a controller programmed to assign samples to pre-defined sample preparation workflows. Each workflow can comprise a pre-defined sequence of sample preparation steps and can require a pre-defined time for completion depending on the analytes of interest. The controller can also be programmed to assign an LC channel (C1-$n$, C'1-$n$) for each prepared sample depending on the analytes of interest, to plan an LC channel input sequence (I1-$n$) for inputting the prepared samples that allows analytes of interest from different LC channels (C1-$n$, C'1-$n$) to elute in a non-overlapping LC eluate output sequence (E1-$n$) based on expected elution times, to set and initiate a sample preparation start sequence (S1-$n$) that generates a prepared sample output sequence (P1-$n$) out of the sample preparation station that matches the LC channel input sequence (I1-$n$) so that when preparation of a sample is completed the assigned LC channel (C1-$n$, C'1-$n$) is also available and the prepared sample can be inputted into the assigned LC channel (C1-$n$, C'1-$n$), before preparation of another sample is completed or before the next prepared sample arrives to the sample preparation/LC interface, and to set a reference period and to start preparation of at most one sample per reference period with possible one or more reference periods between consecutive samples in the sample preparation start sequence (S1-$n$) and/or complete preparation of at most one sample per reference period with possible one or more reference periods between consecutive prepared samples of the prepared sample output sequence (P1-$n$) and/or input one prepared sample per reference period into one of the LC channels (C1-$n$, C'1-$n$) with possible one or more reference periods between consecutive LC channel inputs of the LC channel input sequence (I1-$n$) and/or output one LC eluate per reference period with possible one or more reference periods between consecutive LC eluates of the LC eluate output sequence (E1-$n$).

Accordingly, it is a feature of the embodiments of the present disclosure to provide for a system and a method that makes use of a LC coupled to mass spectrometry more convenient and more reliable and therefore suitable for clinical diagnostics such that high-throughput, e.g. up to 100 samples/hour or more with random access sample preparation and LC separation can be obtained while enabling online coupling to mass spectrometry as well as being fully automated to increase the walk-away time and decrease the level of skills required. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 7 illustrates three examples of analyte specific workflows according to an embodiment of the present disclosure.

DETAILED DESCRIPTION

Figure 1:
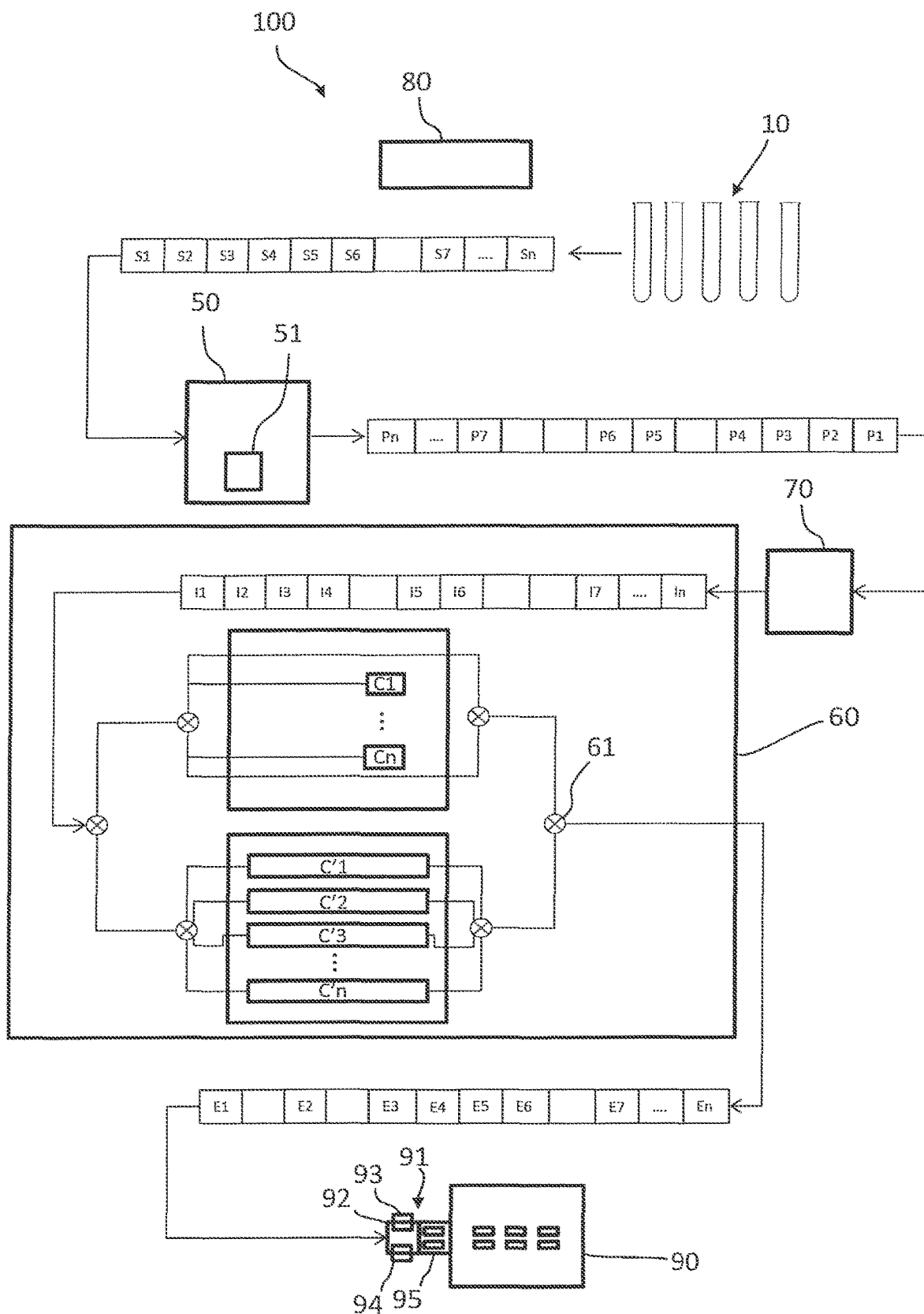
FIG. 1 illustrates schematic representation of a clinical diagnostic system and a clinical diagnostic method according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A clinical diagnostic system and a clinical diagnostic method are described. The clinical diagnostic system can comprise a sample preparation station for the automated preparation of samples comprising analytes of interest, a liquid chromatography (LC) separation station comprising a plurality of LC channels and a sample preparation/LC interface for inputting prepared samples into any one of the LC channels. The clinical diagnostic system can further comprise a controller programmed to assign samples to pre-defined sample preparation workflows, each comprising a pre-defined sequence of sample preparation steps and requiring a pre-defined time for completion depending on the analytes of interest. The controller can further be programmed to assign an LC channel for each prepared sample depending on the analytes of interest and to plan an LC channel input sequence for inputting the prepared samples that can allow analytes of interest from different LC channels to elute in a non-overlapping LC eluate output sequence based on expected elution times. The controller can be further programmed to set and initiate a sample preparation start sequence that generates a prepared sample output sequence that can match the LC channel input sequence.

A "clinical diagnostics system" can be a laboratory automated apparatus dedicated to the analysis of samples for in vitro diagnostics. The clinical diagnostics system may have different configurations according to the need and/or according to the desired laboratory workflow. Additional configurations may be obtained by coupling a plurality of apparatuses and/or modules together. A "module" can be a work cell, typically smaller in size than the entire clinical diagnostics system, which can have a dedicated function. This function can be analytical but can be also pre-analytical or post analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps. In particular, the clinical diagnostics system can comprise one or more analytical apparatuses, designed to execute respective workflows that can be optimized for certain types of analysis, e.g. clinical chemistry, immunochemistry, coagulation, hematology, liquid chromatography separation, mass spectrometry, and the like. Thus the clinical diagnostic system may comprise one analytical apparatus or a combination of any of such analytical apparatuses with respective workflows, where pre-analytical and/or post analytical modules may be coupled to individual analytical apparatuses or be shared by a plurality of analytical apparatuses. Alternatively, pre-analytical and/or post-analytical functions may be performed by units integrated in an analytical apparatus. The clinical diagnostics system can comprise functional units such as liquid handling units for pipetting and/or pumping and/or mixing of samples and/or reagents and/or system fluids, and also functional units for sorting, storing, transporting, identifying, separating, detecting.

The term "sample" can refer to a biological material suspected of containing one or more analytes of interest and whose detection, qualitative and/or quantitative, may be associated to a clinical condition. The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents e.g., to enable carrying out one or more in vitro diagnostic tests, or for enriching (extracting/separating/concentrating) analytes of interest and/or for removing matrix components potentially interfering with the detection of the analyte(s) of interest. The term "sample" can be used to indicate a sample before sample preparation whereas the term "prepared sample" can be used to refer to samples after sample preparation. In non-specified cases, the term "sample" may generally indicate either a sample before sample preparation or a sample after sample preparation or both. Examples of analytes of interest can be vitamin D, drugs of abuse, therapeutic drugs, hormones, and metabolites in general. The list is however not exhaustive.

In particular, the clinical diagnostic system can comprise a sample preparation station for the automated preparation of samples. A "sample preparation station" can be a pre-analytical module coupled to one or more analytical apparatuses or a unit in an analytical apparatus designed to execute a series of sample processing steps aimed at removing or at least reducing interfering matrix components in a sample and/or enriching analytes of interest in a sample. Such processing steps may include any one or more of the following processing operations carried out on a sample or a plurality of samples, sequentially, in parallel or in a staggered manner: pipetting (aspirating and/or dispensing) fluids, pumping fluids, mixing with reagents, incubating at a certain temperature, heating or cooling, centrifuging, separating, filtering, sieving, drying, washing, resuspending, aliquoting, transferring, storing and the like.

According to an embodiment, the sample preparation station can comprise a magnetic bead handling unit for treating samples with reagents comprising magnetic beads carrying analyte and/or matrix selective groups for extracting/enriching analytes of interest and removing or at least reducing matrix components. In particular, the magnetic bead handling unit can comprise at least one magnetic or electromagnetic workstation for holding at least one reaction container and for manipulating magnetic beads added to a sample or samples contained therein. The magnetic bead handling unit may further comprise a mixing mechanism for mixing fluids and/or resuspending the magnetic beads in the reaction container(s), e.g., by shacking or agitating the reaction container(s), e.g., by an eccentric rotation mechanism. Alternatively, the bead handling unit may be a flow-through system where the magnetic beads can be captured in a channel or capillary flow-through device. According to this embodiment, capturing, washing and releasing of analytes can be done by repeatedly magnetically capturing and releasing beads in a flow-through channel.

The term "bead" may not necessarily refer to a spherical shape but to a particle having an average size in the nanometer or micrometer range and having any possible shape.

Non-magnetic beads may also be used. In that case, capturing and releasing may be based on filtration. The sample preparation station may further comprise one or more pipetting device or fluid transport device for adding/removing fluids, such as samples, reagents, wash fluids, suspension fluids, into/from the reaction container(s).

The sample preparation station may further comprise a reaction container transporting mechanism.

Alternatively, or in addition to magnetic bead handling, other techniques may be used such as protein precipitation followed by centrifugation, cartridge based solid phase extraction, pipette tip based solid phase extraction, liquid liquid extraction, affinity based extraction (immunosorption, molecular imprints, aptamers, etc).

A "reagent" can be a substance used for treatment of a sample in order e.g., to prepare a sample for analysis, to enable a reaction to occur, or to enable detection of a physical parameter of the sample or analyte contained in the sample. In particular, a reagent can be a substance that is or comprises a reactant, typically a compound or agent capable e.g. of binding to or chemically transforming one or more analytes present in a sample or an unwanted matrix component of the sample. Examples of reactants are enzymes, enzyme substrates, conjugated dyes, protein-binding molecules, ligands, nucleic acid binding molecules, antibodies, chelating agents, promoters, inhibitors, epitopes, antigens, and the like. However, the term reagent can be used to include any fluid that can be added to a sample including a dilution liquid, including water or other solvent or a buffer solution, or a substance that can be used for disruption of specific or nonspecific binding of an analyte to a protein, binding proteins or surfaces.

Sample may be provided, for example, in sample containers such as sample tubes, including primary tubes and secondary tubes, or multi-well plates, or any other sample carrying support. Reagents may be arranged for example in the form of containers or cassettes containing individual reagents or group of reagents and placed in appropriate receptacles or positions within a storage compartment or conveyor. Other types of reagents or system fluids may be provided in bulk containers or via a line supply.

A "liquid chromatography (LC) separation station" can be an analytical apparatus or module or a unit in an analytical apparatus designed to subject the prepared samples to chromatographic separation in order for example to separate analytes of interest from matrix components, e.g., remaining matrix components after sample preparation that may still interfere with a subsequent detection, e.g., a mass spectrometry detection, and/or in order to separate analytes of interest from each other in order to enable their individual detection. According to an embodiment, the LC separation station can be an intermediate analytical apparatus or module or a unit in an analytical apparatus designed to prepare a sample for mass spectrometry and/or to transfer the prepared sample to a mass spectrometer. In particular, the LC separation station can be a multi-channel LC station comprising a plurality of LC channels arranged in parallel.

An "LC channel" can be a fluidic line comprising at least one capillary tubing and/or LC column comprising a stationary phase selected according to the type of sample(s) and analytes and through which a mobile phase can be pumped in order to trap and/or separate and elute and/or transfer analytes of interest under selected conditions, e.g., according to their polarity or log P value, size or affinity, as generally known. The at least one LC column in the at least one LC channel may be exchangeable. In particular, the LC separation station may comprise more LC columns than LC channels, where a plurality of LC columns may be interchangeably coupled to the same LC channel. A capillary tubing may bypass an LC column or may allow adjustment of dead volumes to fine-tune elution time windows.

According to certain embodiments, the LC separation station can comprise at least one faster LC channel with a shorter cycle time and at least one slower LC channel with a longer cycle time. However, the LC separation station may alternatively comprise at least two faster LC channels without slower LC channels or at least two slower LC channels without faster LC channels.

A "cycle time" can be the time that it takes from a sample input (injection) into an LC channel until the same LC channel is ready for another sample input. In other words, a cycle time can be the minimum time elapsing between two consecutive sample inputs in the same LC channel under pre-determined conditions and can be measured in seconds. The cycle time includes injection time, separation time until elution of the last analyte of interest, and re-equilibration time in order to prepare the column for a new injection.

The terms "faster" and "slower" with reference to an LC channel are only relative terms used to compare different LC channels between them in the same LC separation station. In particular, the terms can be related to the duration of the cycle time and not necessarily to the resolution capabilities of the LC channels. However, typically, a slower LC channel can have a higher resolution than a faster LC channel and a faster LC channel can have a lower resolution than a slower LC channel, where in the faster LC channel resolution may be compromised in favor of speed. Typically, a faster LC channel can have a cycle time of less than 60 seconds, e.g., from about 5 seconds up to about 60 seconds, more typically in the range of 20-40 seconds, whereas a slower LC channel can have a cycle time of more than about 60 seconds, typically can have a cycle time in the range between about 60 seconds and about 600 seconds, more typically 60-400 seconds.

According to an embodiment, the LC separation station can comprise at least two faster LC channels or at least one faster LC channel with at least two interchangeable LC columns and at least two slower LC channels, e.g., two faster LC channels and four slower LC channels. The slower LC channels may be the same or different between them, e.g., one comprising a HILIC column and one comprising a reversed phase (RP) or a pentafluorophenyl (PFP) column, where the conditions can be selected such that the cycle time can be the same for different columns respectively. The faster LC channel(s) may be the same or different between them respectively, e.g., one comprising a HILIC column and one comprising a reversed phase (RP) or a pentafluorophenyl (PFP) column, where the conditions can be selected such that the cycle time can be the same for different columns respectively.

According to one embodiment, the at least one faster LC channel can be a capillary flow injection analysis (FIA) channel or a rapid trap and elute online liquid chromatography channel and the at least one slower LC channel can be an ultra-high-performance liquid chromatography (UHPLC) channel.

In particular, depending on the analytes of interest, each prepared sample may be inputted into a faster LC channel or into a slower LC channel. For example, if a sample requires only analyte purification and concentration, since sufficient separation can be obtained for example in a subsequent mass spectrometry analysis and/or other separation technique, the sample can be inputted into a faster LC channel, e.g., a FIA or rapid trap and elute online liquid chromatography channel. In such a case, a stationary phase can be chosen that can retain the analytes of interest whereas any salts, buffer, detergents and other matrix components can be unretained and washed away. This process can be typically followed by elution of the analytes, e.g., in back flush mode, with a different mobile phase or a solvent gradient. Depending on the analytes, separation of some analytes may be expected in some cases. On the other hand, in case of analytes having identical masses (isobaric) and/or overlapping daughter ion spectra in multiple reaction monitoring (MRM), when it comes to mass spectrometry, a more extensive chromatographic separation may be preferable. In that case, the sample can be inputted into a slower LC channel, e.g. a UHPLC channel.

The LC separation station can typically further comprise a sufficient number of pumps, e.g., binary pumps in case of conditions requiring the use of elution gradients, and several switching valves.

The clinical diagnostic system can further comprise a sample preparation/LC interface for inputting prepared samples into any of the LC channels. A "sample preparation/LC interface" can be either a module between the sample preparation station and the LC separation station or a unit integrated in the sample preparation station or in the LC separation station or sharing components between the sample preparation station and the LC separation station. The sample preparation/LC interface may comprise a container handling unit or a prepared sample receiving unit with any one or more of a holding function, a gripping function, a transfer function.

According to one embodiment, the prepared sample receiving unit can be a reusable recess into which prepared samples can be received one after another according to the prepared sample output sequence just before being inputted into an LC channel, where the recess may be washed between consecutive samples.

The sample preparation/LC interface can comprise a liquid handling unit to input prepared samples to any of the LC channels. The liquid handling unit may comprise any one or more of a pipetting device, a pump, an autosampler, a flow-injection device, one or more switching valves, in one embodiment, at least one switching valve to switch between LC channels. In one embodiment, the container handling unit and the liquid handling unit can be designed to enable random access of any available LC channel to any prepared sample.

The clinical diagnostic system can further comprise a controller. A "controller" can be a programmable logic controller running a computer-readable program provided with instructions to perform operations in accordance with an operation plan and, in particular, associated with sample preparation and LC channel input.

In one embodiment, the controller may cooperate with a scheduler in order to take into account received analysis orders and a number of scheduled process operations associated with the execution of the analysis orders in order to decide when and which sample has to be prepared and for each sample when and which preparation step has to be executed. As different types of samples and/or different analytes of interest contained in the same or different types of samples may require different preparation conditions, e.g., different reagents, or different number of reagents, different volumes, different incubation times, different washing conditions, and the like preparation of different samples may require different sample preparation workflows. The controller can thus be programmed to assign samples to pre-defined sample preparation workflows, each comprising a pre-defined sequence of sample preparation steps, including e.g., different steps and/or a different number of steps, and requiring a pre-defined time for completion, e.g., from a few minutes to several minutes.

The controller thus may schedule sample preparation to occur in parallel or in a staggered manner for different samples. By doing so in a logical manner, the controller can schedule the use of functional resources of the sample preparation station in order to increase efficiency while avoiding conflicts and maximize throughput by preparing samples at a pace at which prepared samples can be inputted into the LC separation station. This can mean that rather than preparing a batch of samples in advance, which of course is also possible, the controller can instruct the sample preparation station to prepare samples as needed or as can be taken from the LC separation station, in particular by the individual LC channels, while taking into account incoming orders, e.g., priority orders, time of preparation, required use of functional resources, and especially availability of the LC channel for which that sample is intended by the time sample preparation is completed.

Sample preparation workflows may be analyte specific and a sample may be assigned to a pre-defined sample preparation workflow depending on the analyte or analytes of interest in the sample. A sample may also undergo a sample pre-treatment workflow that can be typically sample-type specific before being subjected to a pre-defined analyte-specific sample preparation workflow. For example, there may be at least one sample pre-treatment workflow for whole blood, at least one sample pre-treatment workflow for plasma and/or serum, at least one sample pre-treatment workflow for urine, and the like where different sample pre-treatment workflows may include different steps or a different number of steps that may require a different time for completion.

A sample pre-treatment workflow may include processing steps such as addition of an internal standard, addition of a hemolizing reagent, addition of an enzymatic reagent, incubation at a pre-defined temperature, addition of a diluting liquid, and the like.

The controller may thus be programmed to assign also a pre-defined sample pre-treatment workflow to each sample. Of course, any or all of the steps of a sample pre-treatment workflow may be included also in a sample preparation workflow so that the controller may assign only one workflow to each sample and unless specified otherwise the term "pre-defined sample preparation workflow" may include also a sample pre-treatment workflow. Separating sample pre-treatment and sample preparation in two workflows, each of which can be individually initiated, may have the advantage of giving more flexibility to the controller when setting the sample preparation start sequence.

In addition, as the LC separation station can include a plurality of LC channels, it can be advantageous that LC eluates from different LC channels can be outputted in a staggered manner and not simultaneously so that LC eluate outputs can be detected sequentially, e.g. by a single common detector, and better distinguished from each other following a multiplexed approach.

The term "LC eluate" can herein be used to indicate a fraction of the eluate that comprises at least one analyte of interest.

The controller can thus be further programmed to assign (reserve in advance) an LC channel for each prepared sample depending on the analytes of interest and to plan an LC channel input sequence of the prepared samples that can allow analytes of interest from different LC channels to elute in a non-overlapping LC eluate output sequence based on expected elution times.

The controller can be further programmed to set and initiate a sample preparation start sequence, including scheduling the sample preparation steps for each sample, that generates a prepared sample output sequence that corresponds to the LC channel input sequence.

A "sample preparation start sequence" can refer to the order in which samples start to be prepared one after another.

A "prepared sample output sequence" can refer to the order in which preparation of samples that have started sample preparation is completed.

Since different samples in a sample preparation start sequence may undergo different sample preparation workflows that may require different times for completion, the order in which samples start to be prepared may be different from the order in which samples finish to be prepared. In other words, the sample preparation start sequence may be different from the prepared sample output sequence.

An "LC channel input sequence" can refer to the order of LC channels in which the prepared samples in the prepared sample output sequence are inputted one after another.

The controller can be programmed to set and initiate a sample preparation start sequence that can generate a prepared sample output sequence that matches the LC channel input sequence. This can mean scheduling the start and the end of sample preparation for each sample so that when preparation of a sample is completed the assigned LC channel is also available and the prepared sample can be inputted into the assigned LC channel, before preparation of another sample is completed or before the next prepared sample arrives to the sample preparation/LC interface. In this manner, the clinical diagnostic system can be operated continuously and the shortest turn-around time from received analysis order to analysis result can be obtained.

An "LC eluate output sequence" can refer to the order of LC channels from which eluates are outputted one after another. Especially in case of faster and slower LC channels with different cycle times respectively, the LC eluate output sequence may be different from the LC channel input sequence.

By running a multiplexed liquid chromatography separation that combines the use of both slower LC channels and faster LC channels, with longer and shorter cycle time respectively, and by controlling sample preparation and LC channel input in a logic manner that follows a rhythm dictated by a reference period, higher flexibility, in terms of number of different analytes that can be analyzed, and higher sample analysis throughput can be obtained, compared to running for example a sequential separation in faster LC channels only or a multiplexed separation in slower LC channels only.

A "reference period" can be a time frame, the length of which can be fixed, that sets a pace or rhythm at which any one or more of possible events occur and that sets a time boundary within which the one or more events can occur. In particular, it can be advantageous to set the reference period to be as long as the shorter cycle time of a faster LC channel.

For example, the reference period can set the boundaries for the elution time window of the at least one slower LC channel for the elution of analytes of interest. In particular, the run conditions, including type and size of column, mobile phase, elution and re-equilibration conditions, of the at least one slower LC channel can be selected such that the elution time window of the analytes of interest can be as long as or shorter than the reference period.

When assigning LC channels and planning the LC channel input sequence, the controller can take into account the shorter and longer cycle times of the faster and slower LC channels respectively. According to one embodiment, the longer cycle time of the at least one slower LC channel can be n times the shorter cycle time and hence n times the reference period, where n can be an integer number equal or greater than 2. Typically, n is between 2 and 10 (n=2-10). In other words, the longer cycle time can be defined in multiples of the reference period.

According to certain embodiments, sample preparation steps or groups of sample preparation steps of the pre-defined sample preparation workflows can also be scheduled to occur in time windows as long as a reference period or multiples of the reference period. In this case, a pre-defined sample workflow may be completed in a time corresponding to a multiple of reference periods, i.e., n times the reference period, where n is an integer number equal or greater than 2, and where n may be different for different sample preparation workflows.

By expressing the duration of pre-defined sample preparation workflows and/or of cycle times in terms of reference periods, and in particular in multiple of reference periods, where the reference period can be a unit of time with constant length, it can be made easier for the controller to plan the LC channel input sequence and the sample preparation start sequence in order to maximize efficiency and throughput.

According to one embodiment, the preparation of a new sample in the sample preparation start sequence can be started with a frequency of one sample per reference period or at intervals separated by one or more reference periods. This can mean that there may be empty reference periods without a sample preparation being started, in a time line consisting of a sequence of reference periods, among reference periods in which preparation of a new sample is started.

According to one embodiment, the preparation of samples in the prepared sample output sequence can be completed with a frequency of one prepared sample per reference period or at intervals separated by one or more reference periods. Consequently, input of prepared samples in the LC separation station may occur with a frequency of one sample input per reference period or at intervals separated by one or more reference periods. This can mean that there may be empty reference periods without a sample preparation being completed or without a prepared sample being inputted in an LC channel, in a time line consisting of a sequence of reference periods, among reference periods in which preparation of a sample is completed and a prepared sample is inputted in an LC channel.

Completion of a sample preparation and input of the same prepared sample do not have to occur necessarily in the same reference period, but may occur in adjacent reference periods or in reference periods separated by one or more reference periods.

This can allow the controller to have even more flexibility when planning the LC channel input sequence.

According to one embodiment, LC eluates in the LC eluate output sequence can be outputted with a frequency of one LC eluate per reference period or at intervals separated by one or more reference periods. This can mean that there may be empty reference periods without an LC eluate, in the same time line consisting of a sequence of reference periods, among reference periods in which there is an LC eluate.

In particular, the controller can be programmed to set every time the most convenient sample preparation start sequence and LC channel input sequence while trying to minimize the number of empty reference periods in order to maximize throughput. In particular, whenever possible, the controller can try to obtain one LC eluate output per reference period.

In routine practice, depending on the number and type of incoming samples and respective analysis orders, one LC channel rather than another, e.g. a slower LC channel rather than a faster LC channel or vice versa, a type of column in an LC channel rather than another type of column in another LC channel, can be required. It can thus be possible that use of some LC channels can be more frequent than use of other LC channels.

Different embodiments or degrees of flexibility can be possible based also on the number and type of LC channels, e.g., on the number and type of the faster and slower LC channels respectively.

According to some embodiments, in order to explain the concept with one example, the LC separation station may comprise two faster LC channels and four slower LC channels. The shorter cycle time and hence the reference period may be for example 36 sec, whereas the longer cycle time may be for example 288 sec, i.e., eight times the reference period (8×36 sec). The run conditions of the slower LC channels can be selected such that the elution time window for the slower LC channels can be equal to or less than 36 sec, in this case. The two faster LC channels can run sequentially with a throughput of one sample per reference period (36 sec/sample). The four slower LC channels can run in a staggered manner with a throughput of one sample every two reference periods (72 sec/sample). Since the elution time window of the slower LC channels can be equal or less than a reference period and LC eluates from the faster LC channels come at intervals of two reference periods, it can be possible to input a new sample every reference period and to run a faster LC channel between two consecutive elution windows of the slower LC channels and thereby obtain an LC eluate output from either a faster LC channel or a slower LC channel per reference period, in this case every 36 sec. In this example a throughput of one sample/36 sec, i.e., 100 samples/hour can be obtained.

The shorter cycle time and thereby the reference period can be adjustable according to the desired throughput of the clinical diagnostic system and/or according to the number and type of faster and slower LC channels respectively and/or according to the pre-defined sample preparation workflows.

In the above example, sample input into a faster LC channel would be alternated to sample input into a slower LC channel if all LC channels were continuously used.

The actual throughput may change every time that analysis of a new series of samples is scheduled, depending on the number and type of incoming samples and respective analysis orders, on an eventual prioritization of samples, and on the LC channel configuration. It can be possible, for example, that two or more faster LC channels run between two consecutive slower LC channels or vice versa. It can also be possible, for example, that for a series of samples only slower LC channels can be used. With the configuration of the above example, then only a throughput of one sample every two reference periods can be obtained. Of course, by changing the number of LC channels, e.g., by having a sufficiently high number of LC channels, and/or the respective cycle times a throughput of one sample per reference period may eventually be obtained in any scenario or at least in most cases. As a continuation of the above example, this can be obtained, for example, with an LC channel configuration comprising eight slower LC channels or with the same number of slower LC channels having a cycle time four times the reference period instead of eight times the reference period.

In planning of a new LC channel input sequence and setting a new sample preparation start sequence, the controller can take into account information about a number of clinical diagnostic tests to be carried out. For example, the user can select the type and number of tests to be carried out based on received test orders or expected test orders, e.g., manually or by scanning barcodes or reading any other sample-specific information-carrying tag. Also for example, the clinical diagnostic system can automatically register orders when samples enter the system, e.g., by reading barcodes or any other sample-specific information-carrying tag. Also for example, the controller can be connected to a laboratory information system (LIS) or hospital information system (HIS) in order to automatically track incoming test orders and prepare for the incoming test orders, thus planning LC channel input sequence and sample preparation start sequence before the sample actually arrive or as they arrive.

In particular, the controller may be programmed to plan a new LC channel input sequence and setting a new sample preparation start sequence based also on the order in which samples are transported to or inserted into the clinical diagnostic system. Alternatively, or in addition, the controller may suggest the order in which the samples, e.g., individual samples transported on single container carriers, such as pucks, have to be transported to the clinical diagnostic system in order to optimize LC channel input sequence and sample preparation start sequence. According to one embodiment, the LC channel input sequence and sample preparation start sequence may be continuously and dynamically updated as new samples are provided. This may take into account arrival of emergency samples with higher priority compared to other samples. The clinical diagnostic system, e.g., the sample preparation station, may also comprise a buffer unit for receiving a plurality of samples before a new sample preparation start sequence is initiated, where the samples may be individually randomly accessible and the individual preparation of which may be initiated according to the sample preparation start sequence.

According to some embodiments, the clinical diagnostic system can further comprise a mass spectrometer (MS) and an LC/MS interface for connecting the LC separation station to the mass spectrometer.

According to an embodiment, the LC/MS interface can comprise an ionization source, for the generation of charged analyte molecules (molecular ions) and transfer of the charged analyte molecules into the gas phase. According to some embodiments, the ionization source can be an electrospray-ionization (ESI) source or a heated-electrospray-ionization (HESI) source or an atmospheric-pressure-chemical-ionization (APCI) source or an atmospheric-pressure-photo-ionization (APPI) or an atmospheric-pressure-laser-ionization (APLI) source. The LC/MS interface may comprise however a double ionization source, e.g. both an ESI and an APCI source or a modular exchangeable ionization source.

Such ionization sources are known in the art and not further elucidated here.

In order to optimize ionization conditions, it may be preferable to adjust solvent composition by adding a make-up flow directly before the ion source to adjust pH, salts, buffers or organic content.

According to an embodiment, all LC channels can alternately be connectable to the ionization source and the controller can control a valve switching according to the LC eluate output sequence.

According to an embodiment, the mass spectrometer can be a fast scanning mass spectrometer. According to an embodiment, the mass spectrometer can be a tandem mass spectrometer capable of selecting parent molecular ions, generating fragments by collision induced fragmentation and separating the fragments or daughter ions according to their mass to charge (m/z) ratio. According to an embodiment, the mass spectrometer can be a triple quadrupole mass spectrometer, as known in the art.

According to an embodiment, the LC/MS interface can further comprise an ion mobility module between the ionization source and the mass spectrometer. According to an embodiment, the ion mobility module can be a high-field asymmetric waveform ion mobility spectrometry (FAIMS) module, as also known in the art, and that can achieve separation of molecular ions in the gas phase, including isobaric ions, in milliseconds. An ion mobility gas-phase separation before mass spectrometry can compensate for insufficient chromatographic separation, e.g., of isobaric interferences, especially for LC eluates from the at least one faster LC channel. Furthermore, ion mobility interfaces for mass spectrometers can reduce the overall background signal by preventing background and other non-specific ions to enter the mass spectrometer.

According to an embodiment, the controller can be further programmed to set an ionization source input sequence. The term "ionization source input sequence" can refer to the order in which LC eluates are inputted into the ionization source. Typically, the ionization source input sequence can correspond to the LC eluate output sequence. However, by using for example bypass channels or channels of different length or changing the flow velocity, the ionization source input sequence may be also changed. This can allow the controller to have even more flexibility when planning the LC channel input sequence.

According to an embodiment, LC eluates in the LC eluate output sequence can be inputted into the ionization source with a frequency of one LC eluate per reference period or at intervals separated by one or more reference periods. This can mean that there may be empty reference periods without an LC eluate being inputted into the ionization source, in the same time line consisting of a sequence of reference periods, among reference periods in which there is an ionization source input.

The controller can be programmed to make sure that only one LC eluate per reference period is inputted into the ionization source by taking into account the LC channel input sequence and the LC eluate output sequence and by controlling valve switching accordingly.

A clinical diagnostic method is herein also disclosed. The method can comprise automatically preparing samples comprising analytes of interest.

The method can further comprise inputting the prepared samples into a liquid chromatography (LC) separation station comprising a plurality of LC channels.

The method can further comprise assigning samples to pre-defined sample preparation workflows each comprising a pre-defined sequence of sample preparation steps and requiring a pre-defined time for completion depending on the analytes of interest.

The method can further comprise assigning an LC channel for each prepared sample depending on the analytes of interest.

The method can further comprise planning an LC channel input sequence for the prepared samples that can allow analytes of interest from different LC channels to elute in a non-overlapping LC eluate output sequence based on expected elution times.

The method can further comprise setting and initiating a sample preparation start sequence that can generate a prepared sample output sequence that can match the LC channel input sequence.

According to an embodiment of the clinical diagnostic method, the plurality of LC channels can comprise at least one faster LC channel with a shorter cycle time and at least one slower LC channel with a longer cycle time.

According to an embodiment, the method can comprise setting a reference period. According to an embodiment, the method can comprise setting the reference period to be as long as the shorter cycle time, wherein the at least one slower LC channel can have an elution time window for the elution of analytes of interest that can be as long as or shorter than the reference period.

According to an embodiment, the shorter cycle time can be less than 60 seconds and the longer cycle time can be more than 60 seconds. According to an embodiment, the longer cycle time can be n times the reference period, where n is an integer number equal or greater than 2.

According to an embodiment, the clinical diagnostic method can further comprise starting preparation of a new sample per reference period with possible one or more (empty) reference periods between consecutive samples in the sample preparation start sequence.

According to an embodiment, the clinical diagnostic method can further comprise completing preparation of one sample per reference period with possible one or more (empty) reference periods between consecutive prepared samples of the prepared sample output sequence.

According to an embodiment, the method can further comprise scheduling sample preparation steps or groups of sample preparation steps of the pre-defined sample preparation workflows to occur in time windows as long as a reference period or multiples of the reference period. In this case, the method may comprise completing pre-defined sample workflows in respective times corresponding to multiple of reference periods, i.e., n times the reference period, where n is an integer number equal or greater than 2, and where n may be different for different sample preparation workflows.

According to an embodiment, the clinical diagnostic method can further comprise inputting one prepared sample into any of the LC channels per reference period with possible one or more (empty) reference periods between consecutive LC channel sample inputs out of the prepared sample output sequence.

According to an embodiment, the clinical diagnostic method can further comprise outputting one LC eluate per reference period with possible one or more reference periods between consecutive LC eluates of the LC eluate output sequence.

In order for the at least one slower LC channel to have an elution time window for the elution of analytes of interest that is as long as or shorter than the reference period, the method can comprise setting appropriate chromatographic conditions of the at least one slower LC channel. Setting the appropriate chromatographic conditions may comprise any one or more of adjusting the mobile phase composition, adjusting gradient form, choosing an optimal stationary phase as well as adapting length and diameter of the chromatographic column. The length of the elution time window may be further adjusted by adjusting the flow rate of the mobile phase and/or by temporarily interrupting the flow. Also, extra column effects like increased dead volumes in the LC channel may be used. The skilled person can therefore choose any of the above methods or combinations thereof according to standard method development procedures (such as e.g., as described in "Liquid Chromatography-Mass Spectrometry Methods; Approved Guideline", c62-A, Vol. 34. No. 16, by Clinical and Laboratory Standards Institute) in order to obtain the desired degree of separation and the desired length of the elution time window, depending also on the analytes of interest. As there may be different optimal chromatographic conditions for different analytes, the best compromise that is suitable for as many analytes as possible or at least for classes of analytes can be at least in part empirically determined, e.g. by testing different conditions with a sample comprising a mixture of analytes of interest.

According to an embodiment, the clinical diagnostic method can further comprise alternately connecting the LC channels to an LC/MS interface connecting the LC separation station to a mass spectrometer according to the LC eluate output sequence.

According to an embodiment, the clinical diagnostic method can further comprise separating analytes of interest in an ion mobility module between an ionization source and the mass spectrometer.

The method may comprise optimizing the ionization process and as well as tuning and calibrating the mass spectrometer. Optimal performance can typically be obtained by tuning for every analyte of interest using pure standards. The method may therefore comprise finding the most suitable conditions that can be the best compromise for as many analytes of interest as possible for both the ion source and the mass spectrometer, although not optimal for every analyte, in order to prevent eventually time consuming equilibration during method switching, e.g., changing the ionization source temperature.

According to an embodiment, automatically preparing samples can comprise treating samples with magnetic beads carrying analyte or matrix selective groups or first with beads carrying matrix selective groups and then with beads carrying analyte selective groups or first with beads carrying analyte selective groups and then with beads carrying matrix selective groups.

Treating samples with magnetic beads carrying analyte-selective groups can have the function of enriching analytes by capturing the analytes of interest, washing away bound-free matrix components and then releasing the captured analytes from the beads in a more concentrated matrix-free solution. This method can be used for enriching low molecular weight compounds from complex liquid biological samples such as plasma, serum, whole blood or hemolyzed blood. In particular, it can comprise contacting a sample with functionalized magnetic particles with a hydrophobic surface (selective and not specific to low-molecular weight compounds, e.g., less than 1500 Da compounds), incubating the sample with the particles, thereby adsorbing the analytes to the hydrophobic surface, separating the particles by applying a magnetic field and removing the liquid, optionally washing the particles, eluting the compound from the particles.

The method of treating samples with magnetic beads carrying matrix-selective groups, on the other hand, can be mainly intended to deplete the sample from highly abundant proteins, phospholipids and other matrix components with a molecular weight cut-off of approximately 1500-2000 Da by binding them to the beads, whereas the analytes of interest can remain in the supernatant, which can be then used for further analysis. A similar method is described e.g., in the journal Clinical Biochemistry, 46(7), 652-655.

A combination of both the analyte enrichment technique and the matrix depletion technique, at least for some samples, may have the advantage to extend the number of different analytes that can be extracted from a sample, to avoid unnecessary dilutions, and to be more effective at removing the matrix.

Referring initially to FIG. 1, an example of clinical diagnostic system 100 is described. The clinical diagnostic system 100 can comprise a sample preparation station 50 for the automated pre-treatment and preparation of samples 10 comprising analytes of interest. The sample preparation station 50 can comprise a magnetic bead handling unit 51 for treating samples with magnetic beads carrying analyte and/or matrix selective groups. The clinical diagnostic system 100 can further comprise a liquid chromatography (LC) separation station 60 comprising a plurality of LC channels C1-$n$, C'1-$n$, where C1-$n$ are faster LC channels with a shorter cycle time and C'1-$n$ are slower LC channels with a longer cycle time and where n can be any integer number equal or greater than 1. Thus the LC separation station 60 may comprise at least one faster LC channel C1 with a shorter cycle time and at least one slower LC channel C'1 with a longer cycle time. However, the LC separation station 60 may comprise a plurality of only faster LC channels C1-$n$, where n is at least 2, or a plurality of only slower LC channels C'1-$n$, where n is at least 2.

In this example, the LC separation station 60 can comprise two faster LC channels C1-$n$, where n=2, with a shorter cycle time and four slower LC channels C'1-$n$, where n=4, with a longer cycle time, where the relative length of the respective shorter and longer cycle times is schematically indicated (not to scale) by the different length of the bars representing the LC channels C1-$n$ and C'1-$n$ respectively in FIG. 1. The shorter cycle time can be, for example, 36 seconds and this time can define a reference period. The longer cycle time can be n times the reference period, where n is an integer number equal or greater than 2, for example 8, that is 288 seconds. Also, the elution time windows of the slower LC channels for the elution of analytes of interest can be set to be as long as or shorter than the reference period by choosing the LC columns and setting the chromatographic conditions accordingly.

The two faster LC channels C1-$n$ can be rapid trap and elute online liquid chromatography channels, one of which comprising, for example, a reversed phase column and the other comprising, for example, a HILIC column. The slower LC channels C'1-$n$ are ultra-high-performance liquid chromatography (UHPLC) channels comprising, for example, two reversed phase columns and two HILIC columns respectively.

The clinical diagnostic system 100 can further comprise a sample preparation/LC interface 70 for inputting prepared samples into any one of the LC channels C1-$n$, C'1-$n$.

The clinical diagnostic system 100 can further comprise a controller 80 programmed to assign samples 10 to pre-defined sample preparation workflows, each comprising a pre-defined sequence of sample preparation steps and requiring a pre-defined time for completion depending on the analytes of interest. The controller 80 can be further programmed to assign (reserve in advance) an LC channel C1-$n$, C'1-$n$ for each prepared sample depending on the analytes of interest and to plan an LC channel input sequence I1-$n$ for inputting the prepared samples that can allow analytes of interest from different LC channels C1-$n$, C1-$n$ to elute in a non-overlapping LC eluate output sequence E1-$n$ based on expected elution times. The controller 80 can be further programmed to set and initiate a sample preparation start sequence S1-$n$ that can generate a prepared sample output sequence P1-$n$ that can match the LC channel input sequence I1-$n$.

In FIG. 1 each sample of the sample preparation start sequence S1-$n$, each prepared sample of the prepared sample output sequence P1-$n$ and LC channel input sequence I1-$n$, each LC eluate of the LC eluate output sequence E1-$n$ can be indicated in a segment of a sequence comprising non-overlapping adjacent segments, each segment representing schematically one reference period. Each sequence can thus be a sequence of reference periods or time units, the length of which can be fixed and remain constant across the different sequences. In particular, the shorter cycle time of the faster LC channel can be taken as reference period, in this example, 36 seconds.

Preparation of new samples in the sample preparation start sequence S1-$n$ can be started with a frequency of one sample per reference period, i.e., every 36 seconds in this example, or at intervals separated by one or more reference periods, indicated by empty segments in the sequence, in which no sample preparation is started.

Also, preparation of samples in the prepared sample output sequence P1-$n$ can be completed with a frequency of one prepared sample per reference period or at intervals separated by one or more reference periods, indicated by empty segments in the sequence, in which no sample preparation is completed.

Also, the prepared samples can be inputted in the respective assigned LC channels according to the LC channel input sequence I1-$n$ with a frequency of one LC channel input per reference period or at intervals separated by one or more reference periods, indicated by empty segments in the sequence, in which no LC channel input takes place.

Also, the LC eluates in the LC eluate output sequence E1-$n$ can be outputted with a frequency of one LC eluate per reference period or at intervals separated by one or more reference periods, indicated by empty segments in the sequence, in which no LC eluate is outputted.

The clinical diagnostic system 100 can further comprise a mass spectrometer (MS) 90 and an LC/MS interface 91 for connecting the LC separation station 60 to the mass spectrometer 90. The LC/MS interface 91 can comprise an ionization source 92 and an ion mobility module 95 between the ionization source 92 and the mass spectrometer 95. The ion mobility module 95 can be a high-field asymmetric waveform ion mobility spectrometry (FAIMS) module. The mass spectrometer 90 can be a tandem mass spectrometer and, in particular, a triple quadrupole mass spectrometer, capable of multiple reaction monitoring (MRM).

The LC channels C1-$n$, C'1-$n$ can be alternately connectable to the LC/MS interface 91 and the controller 80 can control a valve switching 61 according to the LC eluate output sequence E1-$n$ for inputting one LC eluate at a time into the ionization source 92. In particular, the LC eluates in the LC eluate output sequence E1-$n$ can be inputted into the ionization source 92 with a frequency of one LC eluate per reference period or at intervals separated by one or more reference periods according to the LC eluate output sequence E1-$n$.

The ionization source 92 can be a double ionization source, including an ESI source 93 and an APCI source 94, where depending on the LC eluate in the LC eluate output sequence E1-$n$ and on the analyte(s) of interest contained therein the controller 80 may select one of the two ionization sources 93, 94 that can be most appropriate. When setting the sample preparation start sequence S1-$n$, the controller 80 may group together (place adjacent to each other in the sequence) samples also according to the ionization source 93, 94 so that frequent switch between ionization sources 93, 94 can be prevented. Ionization source switching may be planned during one or more empty reference periods for example.

With continued reference to FIG. 1 a clinical diagnostic method is also illustrated. The method can comprise automatically preparing samples 10 comprising analytes of interest and inputting prepared samples into a liquid chromatography (LC) separation station 60 comprising a plurality of LC channels C1-$n$, C'1-$n$. The method can further comprise assigning samples to pre-defined sample preparation workflows (elucidated in more detail in FIGS. 2-4), each comprising a pre-defined sequence of sample preparation steps and requiring a pre-defined time for completion depending on the analytes of interest and possible on the type of sample. The method can further comprise assigning an LC channel C1-$n$, C'1-$n$ for each prepared sample (elucidated in more detail in FIG. 5) depending on the analytes of interest. The method can further comprise planning an LC channel input sequence I1-$n$ for the prepared samples that can allow analytes of interest from different LC channels C1-$n$, C'1-$n$ to elute in a non-overlapping LC eluate output sequence E1-$n$ based on expected elution times. The method can further comprise setting and initiating a sample preparation start sequence S1-$n$ that can generate a prepared sample output sequence P1-$n$ that can match the LC channel input sequence I1-$n$.

The clinical diagnostic method can further comprise starting preparation of one sample per reference period with possible one or more reference periods between consecutive prepared samples of the sample preparation start sequence S1-$n$.

The clinical diagnostic method can further comprise completing preparation of one sample per reference period with possible one or more reference periods between consecutive prepared samples of the prepared sample output sequence P1-$n$.

The clinical diagnostic method can further comprise outputting one LC eluate per reference period with possible one or more reference periods between consecutive LC eluates of the LC eluate output sequence E1-$n$.

The clinical diagnostic method can further comprise alternately connecting the LC channels C1-$n$, C'1-$n$ according to the LC eluate output sequence E1-$n$ to an LC/MS interface 91 connecting the LC separation station 60 to a mass spectrometer 90.

The clinical diagnostic method can further comprise separating analytes of interest in an ion mobility module 95 between the ionization source 92 and the mass spectrometer 90.

Figure 2:
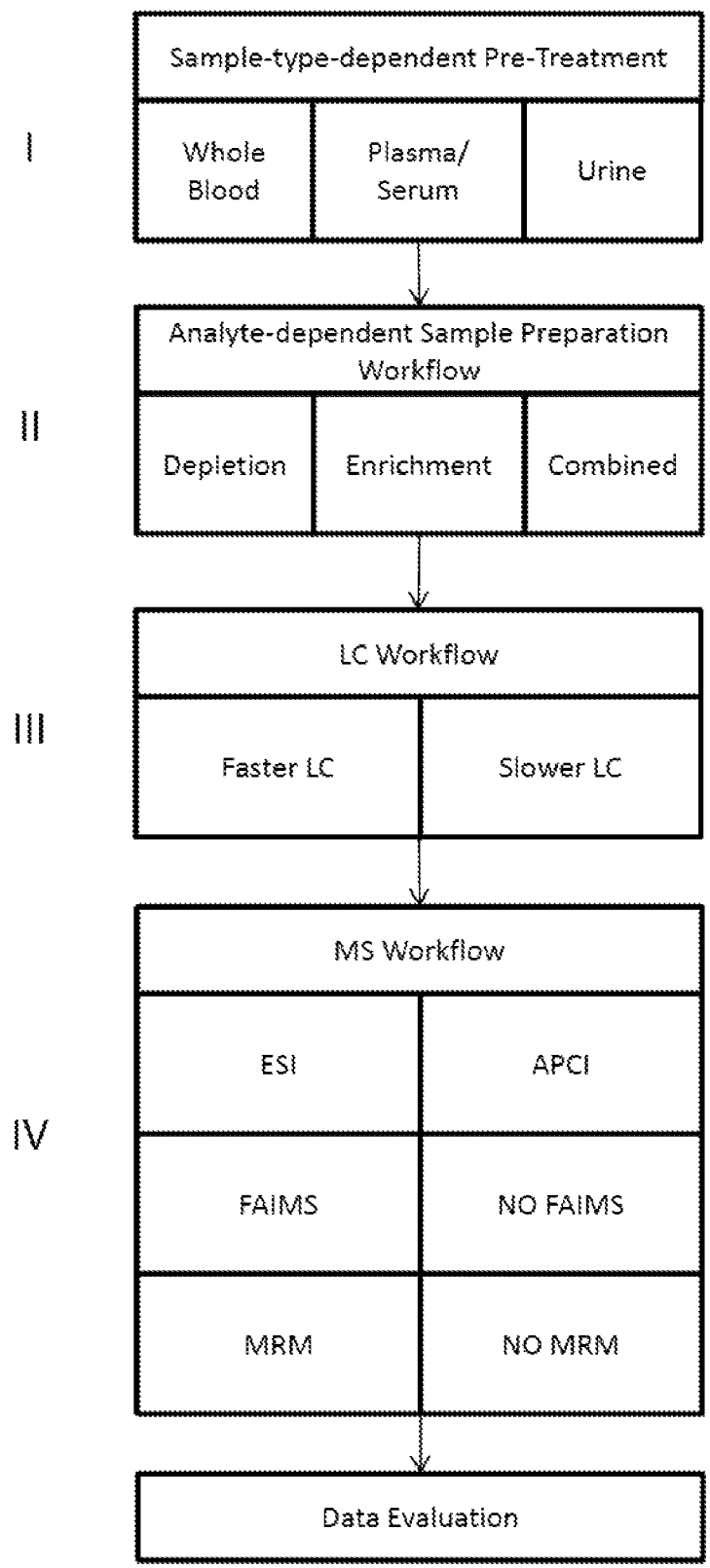
FIG. 2 illustrates schematically elements of a clinical diagnostic method according to an embodiment of the present disclosure.

FIG. 2 schematically represents elements of a clinical diagnostic method and, in particular, a combination of possible workflow paths that, depending on the sample type and/or the analytes of interest in a sample, a sample can follow as determined by the controller.

For example, depending on the type of sample, e.g., whole blood, plasma, serum, urine, a sample can be assigned to one of some pre-defined sample type-dependent pre-treatment workflows (part I) that can be most appropriate for that type of sample.

Also, depending on the analytes of interest, e.g. individual analytes or classes of analytes having similar chemical structure or properties, following the sample-type dependent pre-treatment in part I, a sample can be assigned to one of some pre-defined analyte-dependent sample preparation workflows, e.g., based on a matrix depletion method, an analyte enrichment method, or a combination of both, that is most appropriate for that type of analyte(s) (part II).

Also, depending on the analytes of interest, a prepared sample can be assigned to a particular LC channel that can be most appropriate for separating or transferring that type of analyte(s) to the mass spectrometer and, in particular, it may be assigned to one of a faster LC channel or a slower LC channel (part III).

Also, depending on the analytes of interest, an LC eluate can be inputted into one of the ionization sources that can be most appropriate, e.g., an ESI or APCI source and can either be subjected to separation in the FAIMS module or not (Part IV). Also the path in the mass spectrometer can be pre-defined and, in particular, it can be decided whether to undergo multiple reaction monitoring (MRM) or not (No MRM).

Finally, following mass spectrometry, data evaluation, i.e., identification and possibly quantitation of each analyte of interest for each sample can be made.

Figure 3:
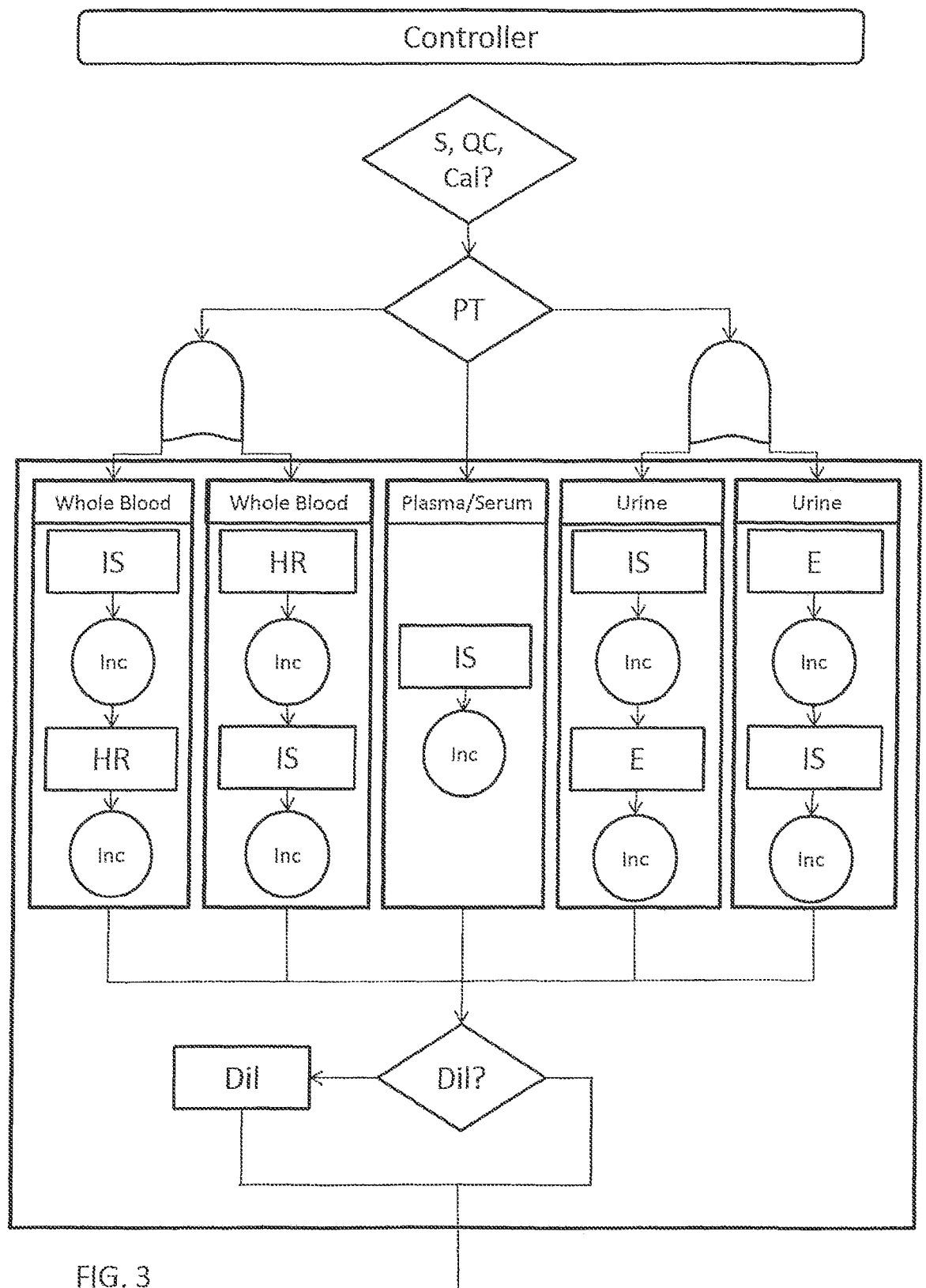
FIG. 3 illustrates a flow chart representing a first part of the clinical diagnostic method of FIG. 2 in more detail according to an embodiment of the present disclosure.

FIG. 3 is a flow chart representing part I of the clinical diagnostic method of FIG. 2 in more detail and, in particular, the sample pre-treatment part. The controller can first determine whether to assign a pre-defined workflow to a sample S or whether a quality control (QC) or a calibration (Cal) has to be carried out. A QC and/or a calibration workflow may follow at least some of the same steps as one of the sample workflows with the possible addition or deletion of some of the steps. For the purpose of this example, only sample-type-dependent pre-treatment (PT) workflows are described.

For example, if the sample is a whole blood sample, it can be assigned to one of two pre-defined sample PT workflows, both comprising the addition of an internal standard (IS) and a hemolysis reagent (HR) followed by a pre-defined incubation period (Inc), where the difference between the two workflows is the order in which the internal standard (IS) and a hemolysis reagent (HR) are added. An internal standard (IS) can be typically a known amount of the same analyte(s) of interest that may be for example isotopically labeled. This can allow relative comparison, and may enable unambiguous identification and quantification of the analyte(s) of interest present in the sample when the analyte(s) reach the mass spectrometer.

If the sample is a urine sample, it can be assigned to one of other two pre-defined sample PT workflows, both comprising the addition of an internal standard (IS) and an enzymatic reagent (E) followed by a pre-defined incubation period (Inc), where the difference between the two workflows is the order in which the internal standard (IS) and an enzymatic reagent (HR) can be added. An enzymatic reagent can typically be a reagent used for glucuronide cleavage or protein cleavage or any pre-processing of analyte or matrix.

If the sample is plasma or serum, it can be assigned to another pre-defined PT workflow including only the addition of an internal standard (IS) followed by a pre-defined incubation time (Inc). Optionally, it may further include the addition of a lysis reagent (not shown).

All of the above sample-type-dependent PT workflows may comprise the addition of a dilution liquid (Dil). However, the addition of a dilution liquid (Dil.) may be also specifically linked to any one or more of the above sample-type-dependent PT workflows.

Figure 4:
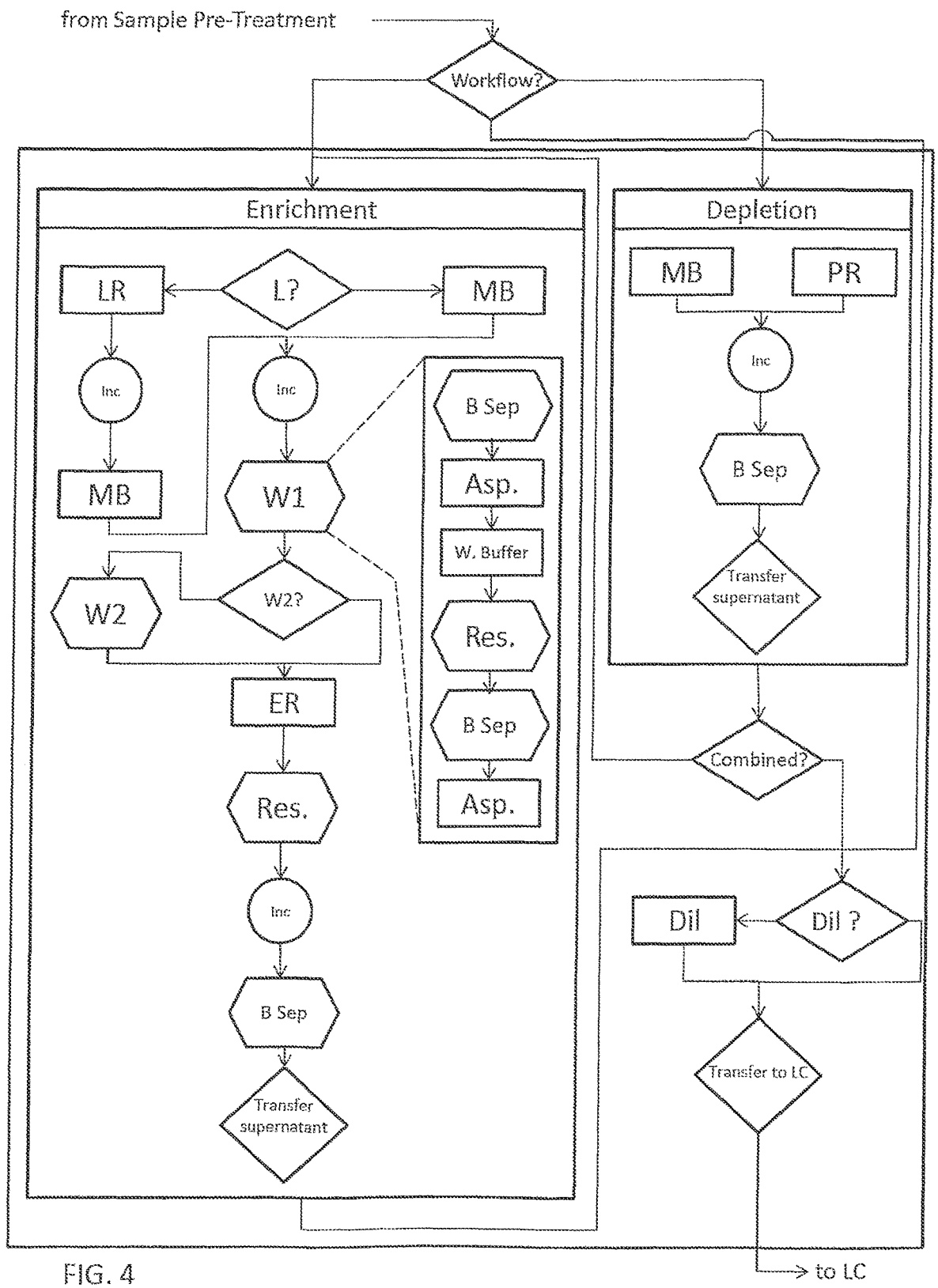
FIG. 4 illustrates a flow chart representing a second part of the clinical diagnostic method of FIG. 2 in more detail and is a continuation of the flow chart of FIG. 3 according to an embodiment of the present disclosure.

FIG. 4 is a flow chart representing Part II of the clinical diagnostic method of FIG. 2 in more detail and is a continuation of the flow chart of FIG. 3. In particular, the controller can assign each pre-treated sample to one of pre-defined analyte-dependent sample preparation workflows depending on the analyte(s) of interest in the pre-treated sample.

For example, a pre-treated sample can undergo an analyte enrichment workflow, a matrix depletion workflow or a matrix depletion workflow followed by an analyte enrichment workflow.

The analyte enrichment workflow can comprise addition of magnetic beads (MB) carrying analyte-selective groups to the pre-treated sample followed by a pre-defined incubation period (Inc) for capturing the analyte(s) of interest, where the addition of the magnetic beads (MB) may include agitation or mixing. The addition of the magnetic beads (MB), depending on the analyte(s) of interest, may be preceded by addition of a lysis reagent (LR) followed by a pre-defined incubation period (Inc). A lysis reagent (LR) can be a reagent for lysis of erythrocytes or release from binding protein or release from unspecific binding. After incubation with the magnetic beads (MB), the workflow can comprise a washing step (W1) and depending on the analyte(s) possibly one or more additional washing steps (W2). A washing step (W1, W2) can comprise a series of steps including magnetic bead separation (B sep) by a magnetic bead handling unit comprising magnets or electromagnets, aspiration of liquid (Asp.), addition of a washing buffer (W. Buffer), resuspension of the magnetic beads (Res.), another magnetic bead separation step (B Sep) and another aspiration of the liquid (Asp.). Moreover, washing steps may differ in terms of type of solvent (water/organic/salt/pH), apart from volume and number or combination of washing cycles.

The last washing step (W1, W2) can be followed by the addition of an elution reagent (ER) followed by resuspension (Res.) of the magnetic beads and a pre-defined incubation period (Inc.) for releasing the analyte(s) of interest from the magnetic beads. The bound-free magnetic beads can then be separated (B Sep.) and the supernatant containing the analyte(s) of interest can be directly transferred to the LC station or after a dilution step by addition of a dilution liquid (Dil.). Different elution procedures/reagents may also be used, by changing e.g., the type of solvents (water/organic/salt/pH) and volume.

The matrix depletion workflow can comprise the addition of magnetic beads carrying matrix selective groups (MB) and a precipitation reagent (PR) to the pre-treated sample followed by a pre-defined incubation period (Inc.), for capturing the matrix components while leaving the analyte(s) of interest in the supernatant, followed by Bead separation (B Sep.) and transfer of the supernatant containing the analyte(s) of interest to LC station directly or after dilution (Dil.).

Depending on the analyte(s) of interest, the supernatant derived from the matrix depletion workflow can undergo the analyte enrichment workflow following thereby a combined sample preparation workflow.

Figure 5:
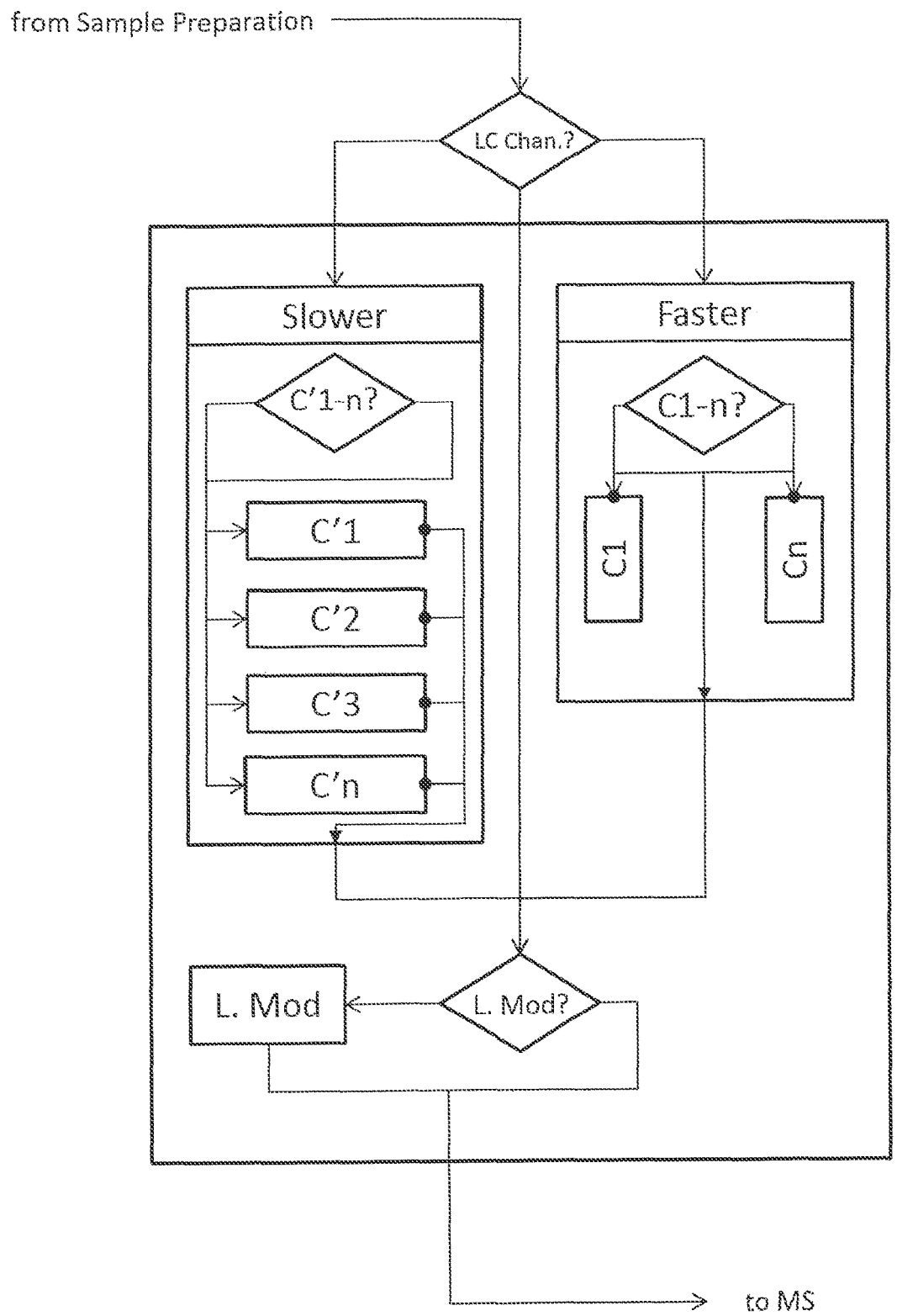
FIG. 5 illustrates a flow chart representing a third part of the clinical diagnostic method of FIG. 2 in more detail and is a continuation of the flow chart of FIG. 4 according to an embodiment of the present disclosure.

FIG. 5 is a flow chart representing Part III of the clinical diagnostic method of FIG. 2 in more detail and is a continuation of the flow chart of FIG. 4. In particular, the controller can assign to each prepared sample an LC channel. The LC channel can be either a faster LC channel C1-$n$ or a slower LC channel C'1-$n$, depending on the analyte(s) on interest in the prepared sample. Alternatively, the prepared sample can bypass any of the faster and slower LC channels C1-$n$, C'1-$n$ and go through a flow injection capillary. The controller can then send the LC eluates sequentially according to the LC eluate output sequence to the LC/MS interface after deciding whether a liquid modifier is required or not.

Figure 6:
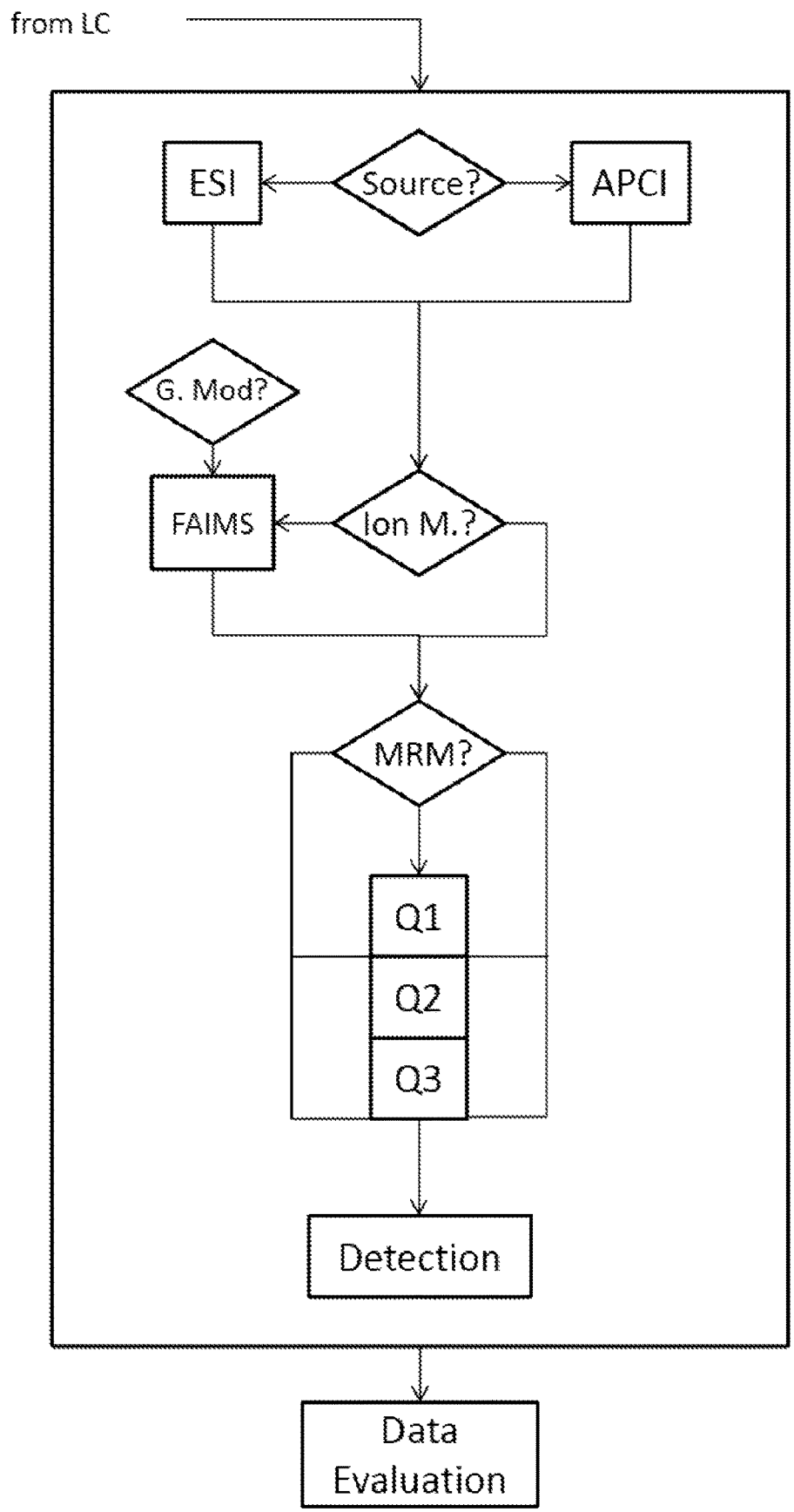
FIG. 6 illustrates a flow chart representing a fourth part of the clinical diagnostic method of FIG. 2 in more detail and is a continuation of the flow chart of FIG. 5 according to an embodiment of the present disclosure.

FIG. 6 is a flow chart representing Part IV of the clinical diagnostic method of FIG. 2 in more detail and is a continuation of the flow chart of FIG. 5. In particular, the controller can assign each LC eluate to one of two ionization sources, either an ESI or an APCI source depending on the analyte(s) of interest in the LC eluate. The controller can then decide whether an ion mobility separation (Ion M.) and in particular a FAIMS is required before mass spectrometry. In that case, it can also be decided whether a gas modifier (G. Mod) is required. In a final decision, the path in the triple quadrupole (Q1, Q2, Q3) mass spectrometer can be decided and, in particular, if multiple reaction monitoring (MRM) is required. Detection can then be followed by data evaluation.

In summary, for each sample and, in particular, for each analyte or each group of analytes of interest, a specific workflow path may be pre-defined in a master table or memory. As different workflow paths may include a different number of steps and/or different steps that may require a different time for completion, when planning the LC channel input sequence I1-$n$ and setting the sample preparation start sequence S1-$n$, the controller can thus take into account the different pre-defined workflow flow paths and their respective duration, including time for each step, and can choose the most convenient sequence that can avoid conflicts and maximizes throughput, e.g., a sequence with the least number of empty reference periods.

FIG. 7 provides three generic examples of analyte specific workflow paths that may be pre-defined in a master table or memory, each including a selection of options among generally selectable options (only most relevant options are indicated for simplicity). These general selectable options can be, for example, the addition of an internal standard (IS) or no addition of IS (no IS); the addition of an enzymatic reagent (E) or one of two lysis reagents (LR #1, LR #2); the enrichment or depletion workflow; one type of magnetic beads (MB A, MB B, MB C, MB D) where different types of magnetic beads selective for groups of analytes (e.g., polar, unpolar, charged, uncharged) or specific for selected analytes (specific binders); one of different pre-defined washing procedures (W #1, W #2, W #3, W #4) including different types of washing liquid (water/organic/salt/pH), volume, number or combination of washing cycles; type of LC channel (slower LC, faster LC, or flow injection analysis (FIA)); one of different pre-defined elution procedures (elution #1, elution #2, elution #3, elution #4), including different types of elution liquid (water/organic/salt/pH) or volume; type of ionization source (ESI, APCI); the option of FAIMS or no FAIMS; and one of different pre-defined mass spectrometric acquisition procedures (settings for ionization, ion transfer, ion selection and fragmentation, detection and data acquisition) and shortly summarized as MS MRM #1, MS MRM #2, MS MRM #3, MS MRM #4, MS MRM #5.

If the analyte of interest is, for example, testosterone, the testosterone-specific workflow can include the addition of an internal standard (IS), the addition of a lysis reagent (LR #1), an enrichment workflow, the addition of testosterone selective magnetic beads (MB C), one of the pre-defined washing procedure (W #2), one of the pre-defined elution procedure (elution #1), injection into a slower LC channel, the use of ESI and FAIMS, and one of the pre-defined mass spectrometric acquisition procedures (MS MRM #4).

If the analytes of interest are for example benzodiazepines, the benzodiazepine-specific workflow can include the addition of an internal standard (IS), the addition of an enzymatic reagent (E), an enrichment workflow, the addition of benzodiazepine selective magnetic beads (MB B), one of the pre-defined washing procedure (W #1), one of the pre-defined elution procedure (elution #2), injection into a faster LC channel, the use of ESI and FAIMS, and one of the pre-defined mass spectrometric acquisition procedures (MS MRM #1).

If the analyte of interest is for example rapamycin, the rapamycin-specific workflow can include the addition of an internal standard (IS), the addition of a lysis reagent (LR #2), the depletion workflow, the addition of matrix selective magnetic beads (MB A), one of the pre-defined washing procedure (W #3), one of the pre-defined elution procedure (elution #3), injection into a faster LC channel, the use of ESI and FAIMS, one of the pre-defined mass spectrometric acquisition procedures (MS MRM #1).

Similarly, workflow paths may be pre-defined for any sample/analyte of interest or groups of analytes of interest.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A clinical diagnostic system, the clinical diagnostic system comprising:
   a sample preparation station for the automated preparation of samples comprising analytes of interest;
   a liquid chromatography (LC) separation station comprising a plurality of LC channels (C1-n, C'1-n) arranged in parallel;
   a sample preparation/LC interface for inputting prepared samples into any one of the LC channels (C1-n, C'1-n); and
   a controller programmed to:
      assign samples to pre-defined sample preparation workflows, each comprising a pre-defined sequence of sample preparation steps and requiring a pre-defined time for completion depending on the analytes of interest,
      assign an LC channel (C1-n, C' 1-n) for each prepared sample depending on the analytes of interest,
      plan an LC channel input sequence (I1-n) for inputting the prepared samples that allows analytes of interest from different LC channels (C1-n, C'1-n) to elute in a non-overlapping LC eluate output sequence (E1-n) based on expected elution times,
      set and initiate a sample preparation start sequence (S1-n) that generates a prepared sample output sequence (P1-n) out of the sample preparation station that matches the LC channel input sequence (I1-n), so that when preparation of a sample is completed the assigned LC channel (C1-n, C'1-n) is also available and the prepared sample can be inputted into the assigned LC channel (C1-n, C'1-n), before preparation of another sample is completed or before the next prepared sample arrives to the sample preparation/LC interface,
      set a reference period and start preparation of at most one sample per reference period with possible one or more reference periods between consecutive samples in the sample preparation start sequence (S1-n) and/or complete preparation of at most one sample per reference period with possible one or more reference periods between consecutive prepared samples of the prepared sample output sequence (P1-n) and/or input one prepared sample per reference period into one of the LC channels (C1-n, C'1-n) with possible one or more reference periods between consecutive LC channel inputs of the LC channel input sequence (I1-n) and/or output one LC eluate per reference period with possible one or more reference periods between consecutive LC eluates of the LC eluate output sequence (E1-n).

2. The clinical diagnostic system according to claim 1, wherein the LC separation station comprises at least one faster LC channel (C1-n) with a shorter cycle time and at least one slower LC channel (C'1-n) with a longer cycle time.

3. The clinical diagnostic system according to claim 2, wherein the controller is programmed to set the reference period to be as long as the shorter cycle time and wherein the at least one slower LC channel (C'1-n) has an elution time window for the elution of analytes of interest that is as long as or shorter than the reference period.

4. The clinical diagnostic system according to claim 2, wherein the shorter cycle time is less than 60 seconds and the longer cycle time is more than 60 seconds.

5. The clinical diagnostic system according to claim 2, wherein the longer cycle time is n times the reference period, wherein n is an integer number equal or greater than 2.

6. The clinical diagnostic system according to claim 2, wherein the at least one faster LC channel (C1-n) is a capillary flow-injection-analysis channel or a rapid trap and elute online liquid chromatography channel and the at least one slower LC channel (C'1-n) is an ultra-high-performance liquid chromatography channel.

7. The clinical diagnostic system according to claim 1, wherein the sample preparation station comprises a magnetic bead handling unit for treating samples with magnetic beads carrying analyte and/or matrix selective groups.

8. The clinical diagnostic system according to claim 1, further comprising,
   a mass spectrometer; and
   an LC/MS interface for connecting the LC separation station to the mass spectrometer.

9. The clinical diagnostic system according to claim 8, wherein the LC/MS interface comprises an ion mobility module between an ionization source and the mass spectrometer.

10. The clinical diagnostic system according to claim 8, wherein all LC channels (C1-n, C'1-n) are alternately connectable to the LC/MS interface and the controller controls a valve switching according to the LC eluate output sequence (E1-n).

11. A clinical diagnostic method, the clinical diagnostic method comprising:
   automatically preparing samples comprising analytes of interest by a sample preparation station and inputting prepared samples via a sample preparation/LC interface into a liquid chromatography (LC) separation station comprising a plurality of LC channels (C1-n, C'1-n) arranged in parallel;
   assigning samples to pre-defined sample preparation workflows, each comprising a pre-defined sequence of sample preparation steps and requiring a pre-defined time for completion depending on the analytes of interest;
   assigning an LC channel (C1-n, C'1-n) for each prepared sample depending on the analytes of interest;
   planning an LC channel input sequence (I1-n) for the prepared samples that allows analytes of interest from different LC channels (C1-n, C'1-n) to elute in a non-overlapping LC eluate output sequence (E1-n) based on expected elution times;
   setting and initiating a sample preparation start sequence (S1-n) that generates a prepared sample output sequence (P1-n) out of the sample preparation station that matches the LC channel input sequence (I1-n), so that when preparation of a sample is completed the assigned LC channel (C1-n, C'1-n) is also available and the prepared sample can be inputted into the assigned LC channel (C1-n, C'1-n), before preparation of another sample is completed or before the next prepared sample arrives to the sample preparation/LC interface;
   setting a reference period; and
   starting preparation of at most one sample per reference period with possible one or more reference periods between consecutive samples in the sample preparation start sequence (S1-n); and/or
   completing preparation of at most one sample per reference period with possible one or more reference periods between consecutive prepared samples of the prepared sample output sequence (P1-n); and/or inputting one prepared sample per reference period into one of the LC channels (C1-$n$, C'1-$n$) with possible one or more reference periods between consecutive LC channel inputs of the LC channel input sequence (I1-$n$); and/or outputting one LC eluate per reference period with possible one or more reference periods between consecutive LC eluates of the LC eluate output sequence (E1-$n$).

12. The clinical diagnostic method according to claim 11 further comprising, alternately connecting the LC channels (C1-$n$, C'1-$n$) to an LC/MS interface connecting the LC separation station to a mass spectrometer according to the LC eluate output sequence (E1-$n$).

13. The clinical diagnostic method according to claim 11, wherein the plurality of LC channels (C1-$n$, C'1-$n$) comprises at least one faster LC channel (C1-$n$) with a shorter cycle time and at least one slower LC channel (C'1-$n$) with a longer cycle time.

14. The clinical diagnostic method according to claim 13, further comprising, setting the reference period to be as long as the shorter cycle time, wherein the at least one slower LC channel (C'1-$n$) has an elution time window for the elution of analytes of interest that is as long as or shorter than the reference period.

* * * * *